(12) United States Patent
Jeong et al.

(10) Patent No.: US 10,361,408 B2
(45) Date of Patent: Jul. 23, 2019

(54) BATTERY MODULE

(71) Applicant: SAMSUNG SDI CO., LTD., Yongin-si, Gyeonggi-do (KR)

(72) Inventors: WunSeok Jeong, Yongin-si (KR); JangGun Ahn, Yongin-si (KR); DooSung Jeon, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 115 days.

(21) Appl. No.: 15/597,561

(22) Filed: May 17, 2017

(65) Prior Publication Data
US 2018/0034013 A1    Feb. 1, 2018

(30) Foreign Application Priority Data

Aug. 1, 2016    (KR) .......................... 10-2016-0098042

(51) Int. Cl.
| *H01M 2/04* | (2006.01) |
| *H01M 10/42* | (2006.01) |
| *H01M 2/10* | (2006.01) |
| *H01M 2/20* | (2006.01) |
| *H01M 2/34* | (2006.01) |
| *H01M 10/46* | (2006.01) |

(52) U.S. Cl.
CPC .......... *H01M 2/1016* (2013.01); *H01M 2/04* (2013.01); *H01M 2/1072* (2013.01); *H01M 2/20* (2013.01); *H01M 2/202* (2013.01); *H01M 2/34* (2013.01); *H01M 10/425* (2013.01); *H01M 10/46* (2013.01); *H01M 2/1077* (2013.01); *H01M 2200/103* (2013.01)

(58) Field of Classification Search
CPC .... H01M 1/1016; H01M 1/04; H01M 1/1072; H01M 1/20; H01M 1/202; H01M 1/34; H01M 10/425; H01M 10/46
USPC .............................................. 429/7
See application file for complete search history.

(56) References Cited

U.S. PATENT DOCUMENTS

| 8,678,842 B2 | 3/2014 | Adachi et al. |
| 8,684,759 B2 | 4/2014 | Adachi et al. |
| 2012/0183813 A1 | 7/2012 | Kim |
| 2015/0295283 A1* | 10/2015 | Eom .................. H01M 10/482 429/61 |

(Continued)

FOREIGN PATENT DOCUMENTS

| EP | 2940759 A1 | 11/2015 |
| JP | 2012-033379 A | 2/2012 |

(Continued)

OTHER PUBLICATIONS

Extended European Search Report issued by the European Patent Office dated Sep. 20, 2017 in the examination of the European Patent Application No. 17181740.6.

*Primary Examiner* — Jayne L Mershon

(74) *Attorney, Agent, or Firm* — Lee & Morse, P.C.

(57) ABSTRACT

A battery module includes a battery pack, a circuit to control charge and discharge operations of the battery pack, a connector through which current is output from the battery pack, a fuse block to selectively interrupt current of the battery pack, a frame to support the circuit, the connector, and the fuse block; and a coupling block accommodating the circuit at a first side and supporting the connector and the fuse block at a second side at upward positions relative to the frame.

18 Claims, 6 Drawing Sheets

(56) References Cited

U.S. PATENT DOCUMENTS

2016/0226347 A1 8/2016 Okamoto et al.

FOREIGN PATENT DOCUMENTS

| JP | 2012-079544 A | 4/2012 |
| JP | 2015-112008 A | 6/2015 |
| JP | 2015-159641 A | 9/2015 |

* cited by examiner

BATTERY MODULE

CROSS-REFERENCE TO RELATED APPLICATION

Korean Patent Application No. 10-2016-0098042, filed on Aug. 1, 2016, and entitled: "Battery Module," is incorporated by reference herein in its entirety.

BACKGROUND

1. Field

One or more example embodiments described herein relate to a battery module.

2. Description of the Related Art

Secondary (rechargeable) batteries power mobile devices, electric vehicles, hybrid electric vehicles, electric bicycles, uninterruptible power supplies, and other electronics. Multi-cell batteries (battery modules) are used for higher power applications, while single-cell batteries are used for lower power applications. For example, single-cell secondary batteries power cellular phones and other small mobile devices. Battery modules with high-output, high-capacity features power devices which are to operate for long periods of time and which consume large amounts of power, e.g., electric vehicles and hybrid electric vehicles. The output voltages or currents of battery modules may be adjusted by adjusting the number of battery cells in the battery modules.

SUMMARY

In accordance with one or more embodiments, a battery module includes a battery pack; a circuit to control charge and discharge operations of the battery pack; a connector through which current is output from the battery pack; a fuse block to selectively interrupt current of the battery pack; a frame to support the circuit, the connector, and the fuse block; and a coupling block accommodating the circuit at a first side and supporting the connector and the fuse block at a second side at upward positions relative to the frame.

The coupling block may include a basic structure; an accommodation part at a lower portion of the basic structure to accommodate the circuit; and first and second coupling parts at upper portions of the basic structure to be coupled with the connector and the fuse block. The first and second coupling parts may include temporarily fixing parts to fix the connector and the fuse block. The first and second coupling parts may include coupling holes, and the battery module may include fasteners inserted through the connector and the fuse block and fitted to the coupling holes.

The connector and the fuse block may include assembly protrusions inserted into the temporarily fixing parts. The temporarily fixing parts may include walls entirely or partially surrounding the assembly protrusions. The first and second coupling parts may be at exclusive positions in a non-overlapping manner. A plurality of first coupling parts may be at positions corresponding to at least two of four corners of the connector, and a plurality of second coupling parts may be at positions corresponding to at least two of four corners of the fuse block.

The first coupling part may be on an upper portion of the basic structure, and the second coupling part may include a wing extending from the basic structure. The wing may include a bending point from which the wing extends in different directions. The basic structure may have a box shape with an open lower side to accommodate the circuit, and a leg with a flange shape for the frame, the leg may be on the opened lower side of the basic structure. The leg may include a third coupling part coupled to the frame. The basic structure may include an opening exposing a front side of the circuit.

The battery module may include a bus bar to provide a current flow path with the fuse block, wherein the coupling block includes a support protrusion and wherein the bus bar is fitted around the support protrusion. The coupling block may include a guide to guide the bus bar. First and second bus bars may be fitted around the support protrusion in an overlapping manner and are electrically connected to the support protrusion. The support protrusion may include a metallic material.

The bus bar may include first and second bus bars electrically connected to each other through a fuse of the fuse block, and the fuse and at least one of the first or second bus bars may be fitted around the support protrusion in an overlapping manner. The battery module may include a cover covering an upper portion of the frame, wherein the connector and the fuse block are exposed from an upper portion of the cover. The connector and the fuse block may be coupled to the coupling block, and the connector and the fuse box may be coupled to the coupling block from an upper side of the cover when the connector and the fuse block are temporarily fixed to the coupling block.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
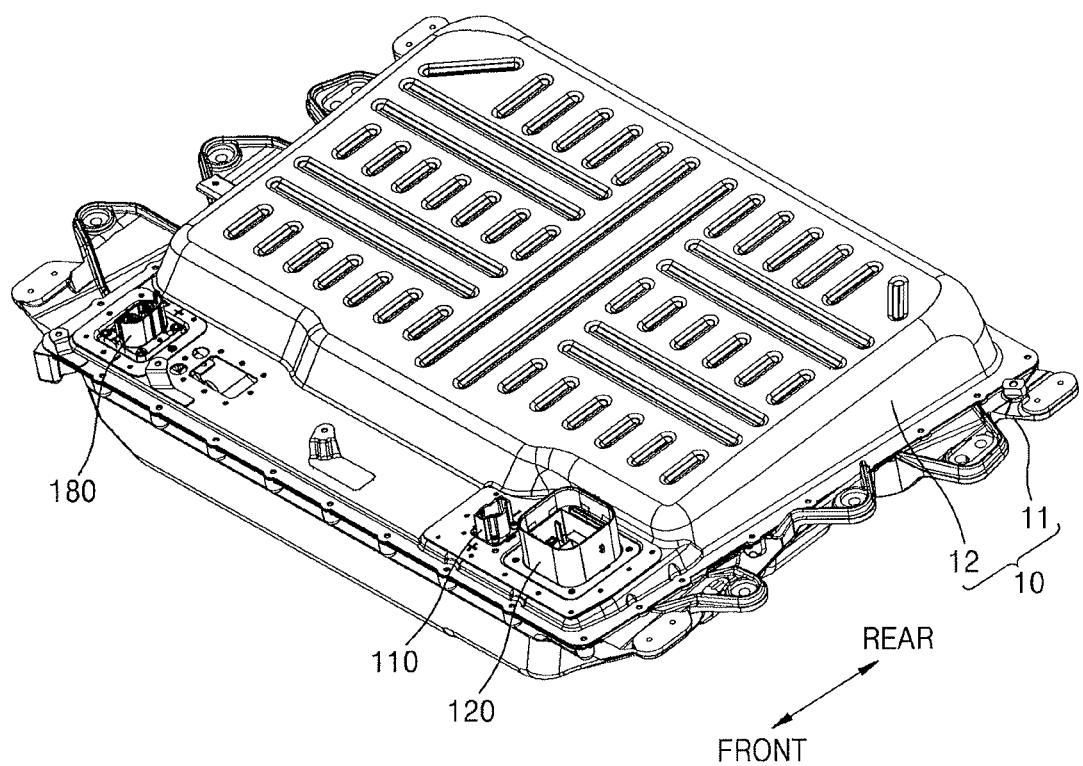
FIG. 1 illustrates an embodiment of a battery module.

Example embodiments will now be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2:
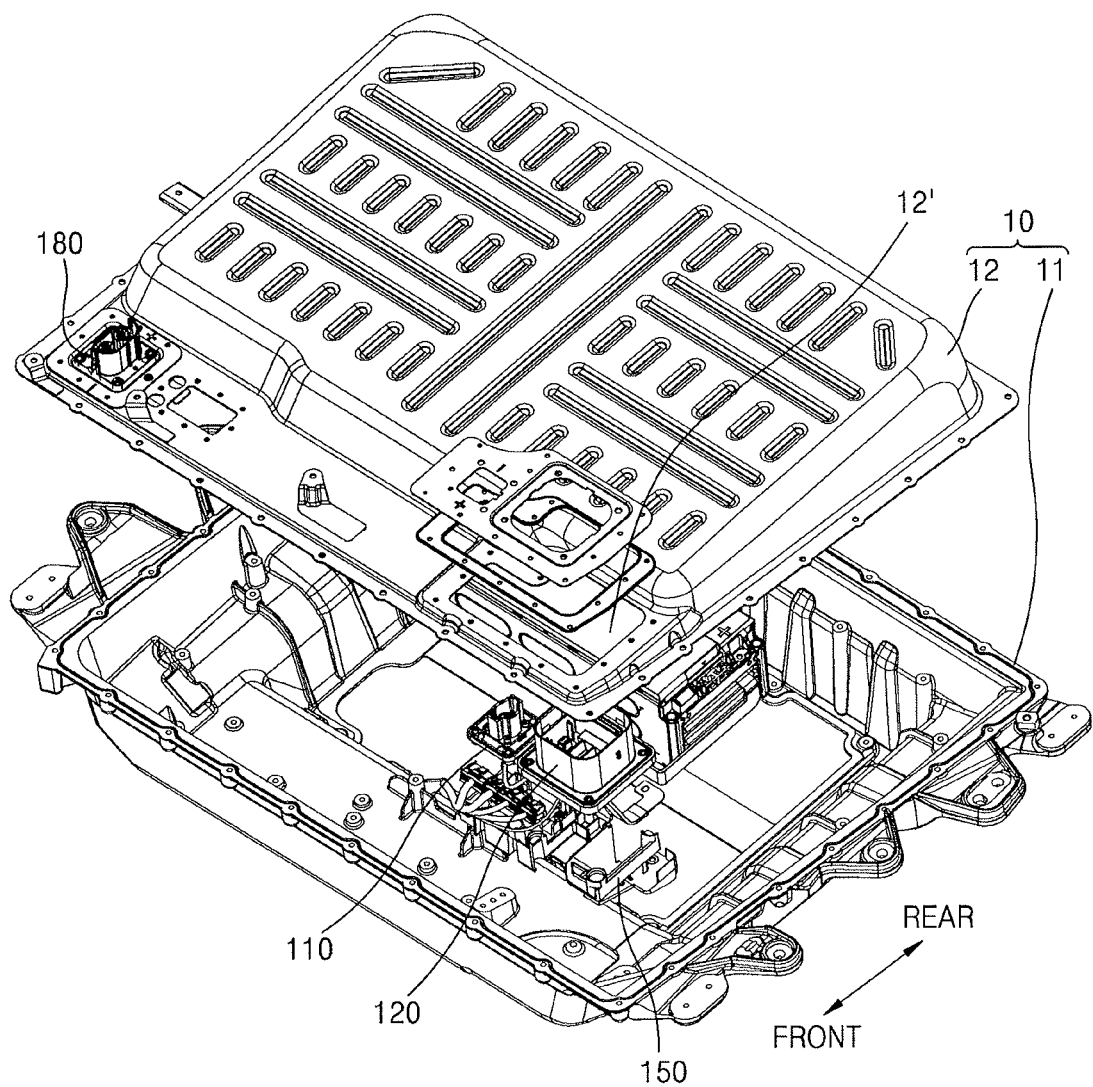
FIG. 2 illustrates an internal embodiment of the battery module.
Figure 3:
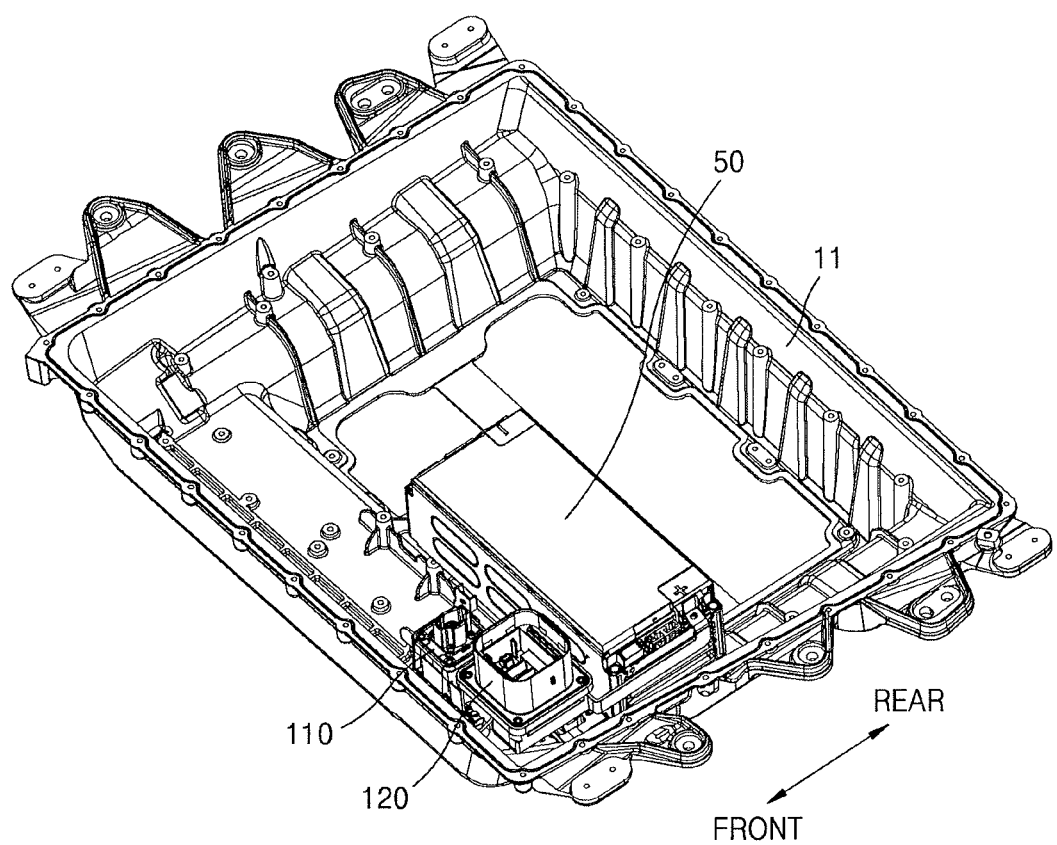
FIG. 3 illustrates another view of the battery module.

FIG. 1 illustrates an embodiment of a battery module. FIG. 2 is an exploded perspective view of an internal embodiment of the battery module. FIG. 3 is a partial perspective view of the battery module.

Referring to FIGS. 1 to 3, the battery module may include a housing 10 accommodating a battery pack 50. The housing 10 may include a frame 11 coupled to a cover 12, with the battery pack 50 therebetween. In one example embodiment, the battery module may include one or more battery packs 50. For example, a plurality of battery packs 50 may be electrically connected in series, parallel, or series-parallel to provide a required degree of electric power.

A circuit unit 20, in frame 11, may control charge and discharge operations of the battery pack 50. A connector 110 may be provided above the frame 11 to carry current output from the battery pack 50. A fuse block 120 may be provided above the frame 11 to selectively interrupt current of the battery pack 50 when the battery pack 50 malfunctions. In addition, a coupling block 150 may be placed on the frame 11 to support the connector 110 and fuse block 120 at upward positions with respect to the frame 11.

The cover 12 may cover the frame 11, above which the connector 110 and the fuse block 120 are placed. The cover 12 may include an opening 12' to expose the connector 110 and the fuse block 120. The connector 110 and the fuse block 120 may be exposed through the opening 12' of the cover 12. Thus, a coupling operation may be performed from an upper side of the cover 12. For example, when the connector 110 and the fuse block 120 are temporarily fixed to upper portions of the coupling block 150, the frame 11 may be covered with the cover 12. Then, the connector 110 and the fuse block 120 (which is exposed through the opening 12' of the cover 12) may be securely fixed using fasteners.

The connector 110 is exposed from the cover 12 to supply electricity of the battery pack 50 to an external device through the connector 110. The battery module may supply driving power to a device (e.g., a vehicle), and the connector 110 may form an output terminal for supplying driving power. The connector 110 may be used to supply driving power to one or more electric components of the vehicle, in addition to or instead of supplying driving power to the vehicle. In one embodiment, the battery module may further include a high-voltage connector 180 to supply driving power.

The fuse block 120 may be exposed from the cover 12. A fuse box, forming a charge/discharge path of the battery pack 50, may be coupled to an upper portion of the fuse block 120. The fuse box may be placed along the charge/discharge path and may interrupt charge/discharge current when errors (e.g., overheating or overcurrent) occurs. For example, the fuse box may include a variable resistor having temperature-dependent resistance or a fuse to block the charge/discharge path according to Joule heating. The charge/discharge path may be formed, for example, by coupling the fuse box to the upper portion of the fuse block 120. Then, the battery module may be ready to operate.

Figure 4:
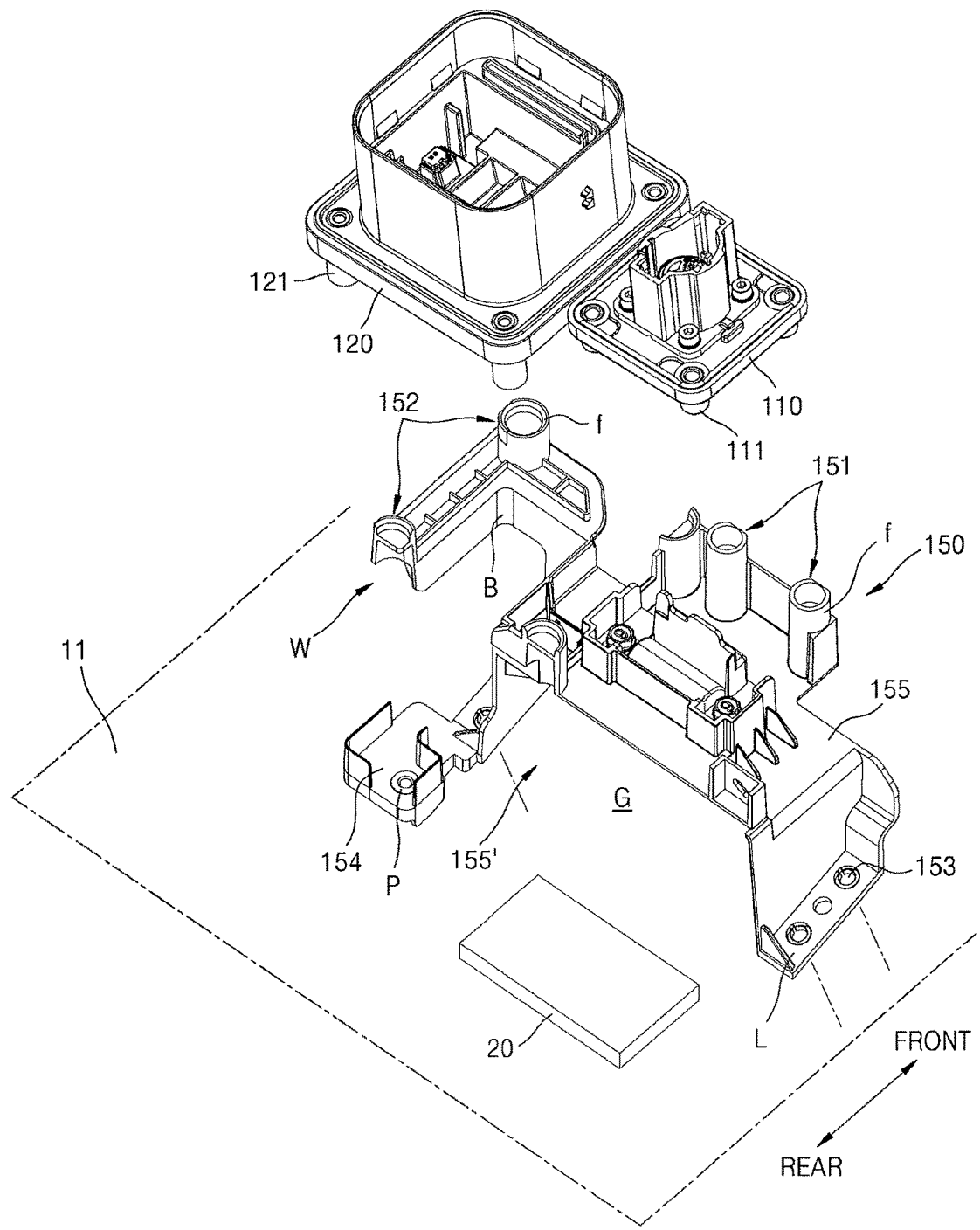
FIG. 4 illustrates another view of the battery module.
Figure 5:
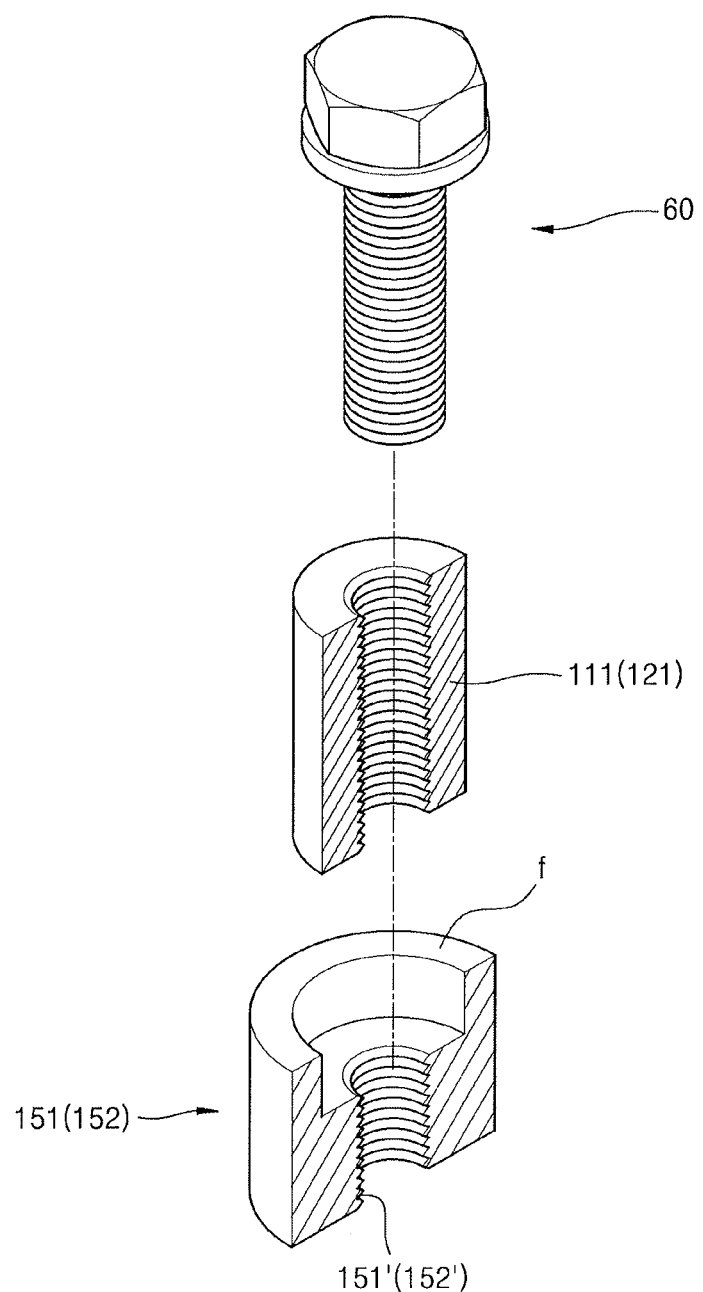
FIG. 5 illustrates an embodiment of a temporarily fixing part.
Figure 6:
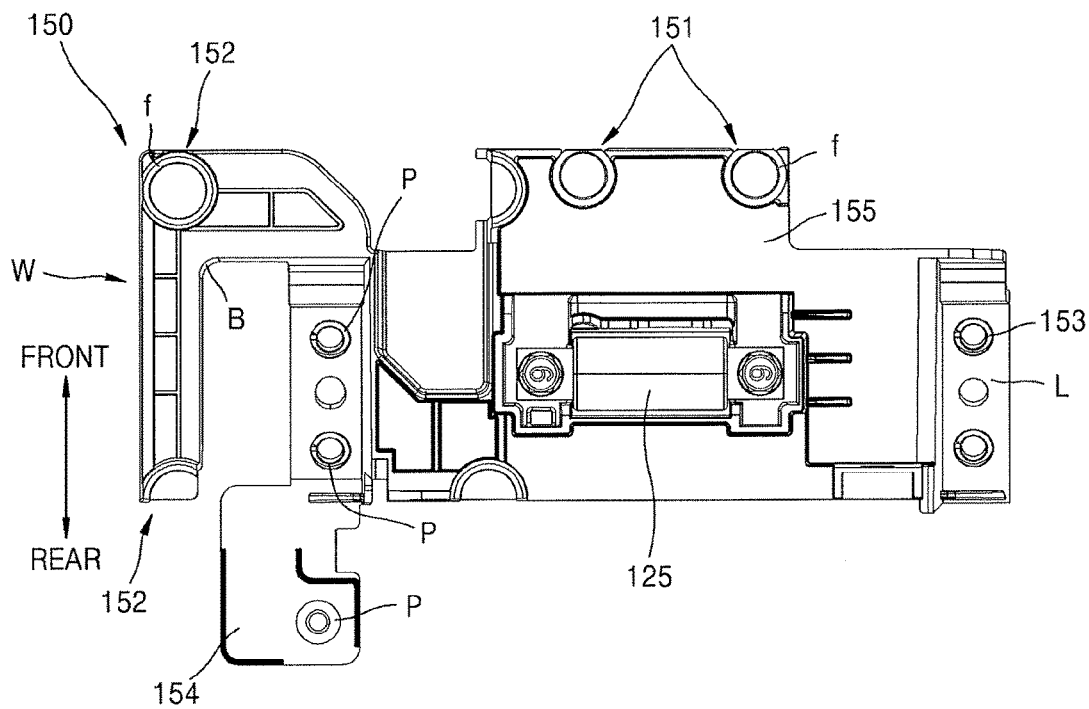
FIG. 6 illustrates an embodiment of a coupling block.
Figure 7:
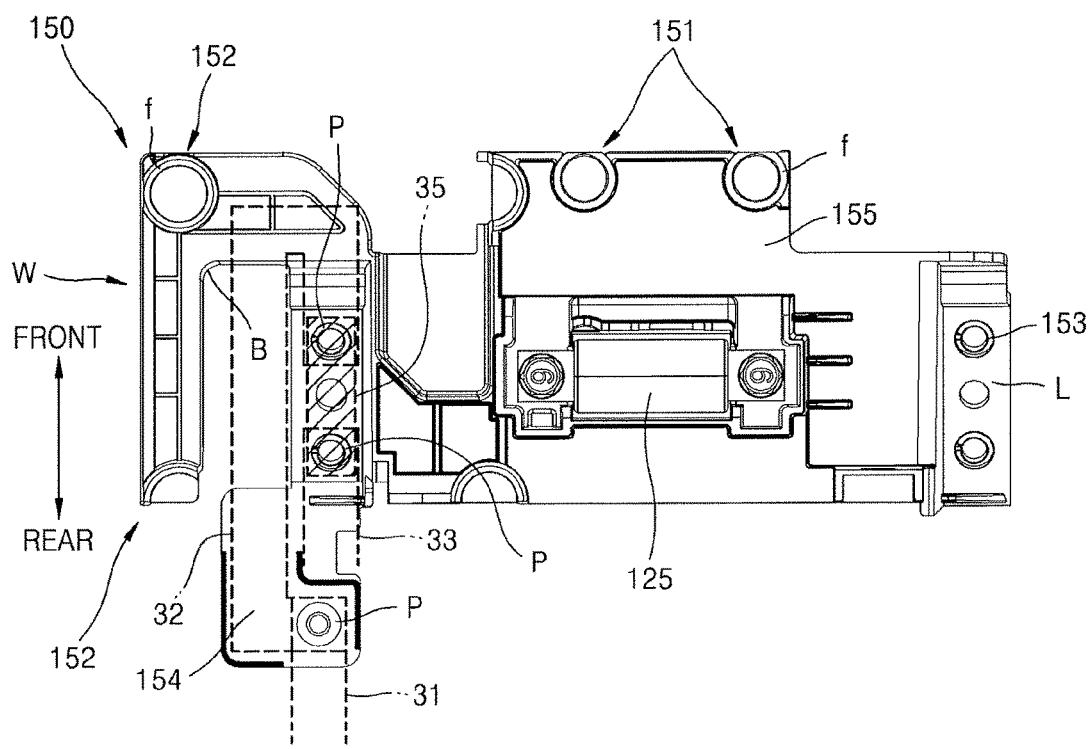
FIG. 7 illustrates an embodiment of a bus bar structure.

FIG. 4 is an exploded perspective view illustrating a portion of the battery module in FIG. 1. FIG. 5 illustrates an embodiment of a temporarily fixing part (f) in FIG. 4. FIG. 6 illustrates an embodiment of the coupling block 150 in FIG. 4. FIG. 7 illustrates an embodiment of a bus bar structure coupled to the coupling block 150 in FIG. 4.

Referring to FIG. 4, the circuit unit 20 may be placed on the frame 11, and the coupling block 150 may be placed on the circuit unit 20 to accommodate the circuit unit 20. The connector 110 and fuse block 120 may be arranged on the coupling block 150.

The coupling block 150 may include an accommodation part G to accommodate the circuit unit 20 and first and second coupling parts 151 and 152 on a side opposite the accommodation part G. The coupling block 150 may support the connector 110 and the fuse block 120 at upward positions, which are spaced from the frame 11 by a certain amount or greater. The connector 110 and the fuse block 120 may be exposed from the cover 12 which covers the frame 11. The connector 110 and the fuse block 120 may be at upward positions from the frame 11, which are spaced from the frame 11 by a certain amount or greater.

The coupling block 150 may include a box-shaped basic structure 155 to accommodate the circuit unit 20 in a lower portion of the basic structure 155 and uphold the connector 110 and the fuse block 120 on an upper portion of the basic structure 155. The lower portion of the basic structure 155 may form the accommodation part G. The upper portion of the basic structure 155 may include the first and second coupling parts 151 and 152. The basic structure 155 may have a box shape open toward the circuit unit 20. The box shape refers to a structure having an open bottom to accommodate the circuit unit 20. In one embodiment, the box shape may have a shape different from a closed shape covering the circuit unit 20. The bottom of the basic structure 155 is open to accommodate the circuit unit 20. In addition, the basic structure 155 may include an opening 155' in a side thereof, to expose a front side of the circuit unit 20 in the basic structure 155.

In the example embodiment, the basic structure 155 may include the opening 155' in a side thereof. The front side of the circuit unit 20 may be exposed through the opening 155'. The circuit unit 20 may include a plurality of heat-generating devices. Thus, the basic structure 155 may not completely cover the circuit unit 20, but may allow exposure of the circuit unit 20 for efficient cooling of the circuit unit 20. For example, the basic structure 155 may have an open bottom to accommodate the circuit unit 20. The opening 155' of the basic structure 155 may be connected to the open bottom.

The coupling block 150 may include temporarily fixing parts (f) to temporarily fix the connector 110 and the fuse block 120. The connector 110 and the fuse block 120 may be placed above the frame 11. A coupling operation for the connector 110 and the fuse block 120 may be performed through the cover 12 covering the frame 11. In other words, since the connector 110 and the fuse block 120 are fixed above the frame 11 after an upper side of the frame 11 is covered with the cover 12, the positions of the connector 110 and the fuse block 120 may be temporarily maintained above the frame 11 until a coupling operation for fixing the connector 110 and the fuse block 120 is performed. Since the coupling block 150 includes the temporarily fixing parts (f) for the connector 110 and the fuse block 120, the positions of the connector 110 and the fuse block 120 may be maintained until the coupling operation is performed after the frame 11 is covered with the cover 12. This structure may reduce the efforts of a worker to hold and support the connector 110 and the fuse block 120 under the cover 12.

The temporarily fixing parts (f) may be formed at various positions of the coupling block 150, as long as the temporarily fixing parts (f) temporarily fix the connector 110 and the fuse block 120, via physical interference with the connector 110 and the fuse block 120, until the connector 110 and the fuse block 120 are finally fixed using fasteners 60. In the example embodiment, the temporarily fixing parts (f) may be on the first and second coupling parts 151 and 152 provided to finally fix the connector 110 and the fuse block 120. As described above, if the temporarily fixing parts (f) are on the first and second coupling parts 151 and 152 that finally fix the connector 110 and the fuse block 120, the difference between temporary and final fixing positions may be reduced even though temporary fixing positions are varied. Also, aligning may be effectively performed in a final coupling operation.

The first and second coupling parts 151 and 152 may be on upper portions of the coupling block 150, e.g., upper portions of the basic structure 155. For example, the first and second coupling parts 151 and 152 for coupling with the connector 110 and fuse block 120 may be at exclusive positions in a non-overlapping manner. For example, the first and second coupling parts 151 and 152 may be formed on left and right sides at different positions. The connector 110 may be coupled to the first coupling part 151, and the fuse block 120 may be coupled to the second coupling part 152.

The first coupling part 151 may be formed directly on the basic structure 155. The second coupling part 152 may include a wing W extending from the basic structure 155. The wing W may have a bent shape with a bending point B, from which the wing W extends in different directions, and may provide coupling positions corresponding to corners of the fuse block 120. Each of the connector 110 and the fuse block 120 has a predetermined shape, e.g., rectangular shape with four corners. The first and second coupling parts 151 and 152 may be formed at positions corresponding to the four corners of the connector 110 and the four corners of the fuse block 120. The first and second coupling parts 151 and 152 may be selectively formed at positions corresponding to some of the four corners of the connector 110 and the four corners of the fuse block 120. For example, the first and second coupling parts 151 and 152 may be formed at positions corresponding to at least one of the four corners of the connector 110 and at least one of the four corners of the fuse block 120.

In the battery module of the present example embodiment, a plurality of first coupling part 151 are at positions corresponding to at least two of the four corners of the connector 110. Similarly, a plurality of second coupling parts 152 are at positions corresponding to at least two of the four corners of the fuse block 120.

Referring to FIG. 5, the first and second coupling parts 151 and 152 may include the temporarily fixing parts (f) to temporarily fix the connector 110 and the fuse block 120. The temporarily fixing parts (f) may be around coupling holes 151' and 152' of the first and second coupling parts 151 and 152. The temporarily fixing parts (f) may include walls surrounding the coupling holes 151' and 152'. Assembly protrusions 111 and 121 on the connector 110 and the fuse block 120 may be inserted into the temporarily fixing parts (f). The temporarily fixing parts (f) may be respectively formed on the first and second coupling parts 151 and 152 at plurality of positions, to temporarily fix the connector 110 and the fuse block 120. Some of the temporarily fixing parts (f) at different positions as described above may have a hollow cylinder shape completely surrounding the assembly protrusions 111 and 121. Other ones of the temporarily fixing parts (f) may have a shape partially surrounding the assembly protrusions 111 and 121.

Referring to FIG. 4, the temporarily fixing parts (f) may be at positions corresponding to the four corners of the fuse block 120. Some of the temporarily fixing parts (f) may completely surround some of the assembly protrusions 121. Other ones of the temporarily fixing parts (f) may partially surround the others of the assembly protrusions 121. This structure may be provided by taking assembly tolerance into account, in order to reduce misalignment between assembly positions of the temporarily fixing parts (f) and the fuse block 120 (that is, the assembly protrusions 121) caused by machining errors or thermal expansion. The temporarily fixing parts (f) partially surrounding the assembly protrusions 121 may absorb assembly tolerance.

The assembly protrusions 111 and 121 may protrude downward from the connector 110 and the fuse block 120 toward the coupling block 150. Each of the connector 110 and the fuse block 120 may have a predetermined shape, e.g., rectangular shape with four corners. The assembly protrusions 111 and 121 may respectively be formed on the corners of the connector 110 and the fuse block 120. The connector 110 and the fuse block 120 may be temporarily fixed by inserting the assembly protrusions 111 and 121 into the temporarily fixing parts (f). In addition, the assembly protrusions 111 and 121 may include penetration holes to receive fasteners 60. The connector 110 and the fuse block 120 may be finally fixed by coupling the fasteners 60 inserted into the assembly protrusions 111 and 121 to the coupling holes 151' and 152'.

During a coupling operation, the connector 110 and the fuse block 120 may be temporarily fixed to upper portions of the coupling block 150, by inserting the assembly protrusions 111 and 121 protruding downward from the connector 110 and the fuse block 120 into the temporarily fixing parts (f) of the coupling block 150. The penetration holes of the connector 110 and the fuse block 120 may be aligned with the coupling holes 151' and 152' of the coupling block 150. Then, after the frame 11 is covered with the cover 12, the fasteners 60 may be moved from an upper side of the cover 12 to the connector 110 and the fuse block 120 exposed through the opening 12' of the cover 12, and may be coupled to the coupling holes 151' and 152' of the coupling block 150 through the penetration holes of the connector 110 and the fuse block 120, in order to finally fix the connector 110 and the fuse block 120.

Referring to FIG. 7, the fuse block 120 may be formed along a charge/discharge path formed by first, second, and third bus bars 31, 32, and 33. The fuse block 120 may interrupt the charge/discharge path in abnormal situations, e.g., an overheating situation or an overcurrent situation. A guide 154 for guiding and supporting the first, second and third bus bars 31, 32, and 33 is on a side of the coupling block 150 to which the fuse block 120 is coupled. The first, second, and third bus bars 31, 32, and 33 may be supported on the guide 154 and may form a current path with the fuse block 120.

The coupling block 150 may include support protrusions P around which the first, second, and third bus bars 31, 32, and 33 are fitted. For example, the first and second bus bars 31 and 32 may be fitted around one of the support protrusion P in an overlapping manner. For example, the first and second bus bars 31 and 32 may be in conductive contact with one of the support protrusions P and may form a charge/ discharge path. The support protrusion P may include a conductive metallic material to reduce electric resistance between the support protrusions P and the first and second bus bars 31 and 32. For example, the coupling block 150 including the guide 154 may include an insulative material to function as an insulator for the first and second bus bars 31 and 32. However, the support protrusion P, around which the first and second bus bars 31 and 32 are fitted, may include a conductive material. The support protrusion P may be on the guide 154 supported by the first and second bus bars 31 and 32.

The fuse block 120 (or the fuse box coupled to the upper portion of the fuse block 120) may include a fuse 35 forming a charge/discharge path. The second and third bus bars 32 and 33 may be connected to different ends of the fuse 35, so that the second and third bus bars 32 and 33 may be electrically connected to each other through the fuse 35. The second bus bar 32 and an end of the fuse 35 may be fitted around one of the support protrusions P, to make conductive contact with each other in an overlapping manner. The third bus bar 33 and the other end of the fuse 35 may be fitted around another one of the support protrusions P, to make conductive contact with each other in an overlapping manner.

The second and third bus bars 32 and 33 may form a bypass including the fuse block 120. The bypass (charge/discharge path) may or may not conduct electricity according to the state of the fuse 35. Before and after a turning point, current may flow into and out from the fuse block 120 through the second and third bus bars 32 and 33.

Referring to FIG. 4, a leg L may be on a lower portion of the coupling block 150 (e.g., a lower portion of the basic structure 155). The coupling block 150 may be placed on the frame 11 through the leg L. The leg L may have, for example, a flange shape extending from the bottom of the basic structure 155 toward the frame 11. The leg L may include a third coupling part 153 for coupling with the frame 11. The coupling block 150 may be fixed to the frame 11 via fasteners inserted through the third coupling part 153.

The coupling block 150 may be formed in one-piece. In one embodiment, the coupling block 150 may be entirely formed of an insulative material. The coupling block 150 may include an insulative material to prevent electric interference with the circuit unit 20, the connector 110, and the fuse block 120.

Referring to FIG. 6, a safety device 125 may be on the coupling block 150. For example, the safety device 125 may be in a safety device pocket which surrounds the safety device 125. If an abnormal situation (e.g., overheating or overcurrent) occurs, the safety device 125 may limit a charge/discharge current flowing through the connector 110 to prevent accidents such as explosions or fires. The connector 110 may include terminals having different polarities. The safety device 125 may be placed along a charge/discharge path including the connector 110, by connecting the safety device 125 to one of the terminals of the connector 110. The safety device 125 may include a variable resistor having temperature-dependent resistance or a fuse to interrupt current according to Joule heating.

According to the present example embodiment, a support structure for supporting the connector 110 and the fuse block 120 at intended heights is provided. Thus, the connector 110 and the fuse block 120 may be externally exposed, and the connector 110 and the fuse block 120 may be easily connected when supplying power.

In accordance with one or more of the aforementioned embodiments, a battery module may be easily assembled. A temporarily fixing structure may temporarily fix a connector and fuse block exposed to the outside. The connector 110 and the fuse block 120 may be temporarily fixed before being finally fixed. Thus, a final fixing operation may be easily performed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A battery module, comprising:
   a battery pack;
   a circuit to control charge and discharge operations of the battery pack;
   a connector through which current is output from the battery pack;
   a fuse block to selectively interrupt current of the battery pack;
   a frame to support the circuit, the connector, and the fuse block;
   a cover covering an upper portion of the frame, and
   a coupling block accommodating the circuit at a first side and supporting the connector and the fuse block at a second side at upward positions relative to the frame,
   wherein the connector and the fuse block are partially exposed by an auxiliary cover of the cover,
   wherein the coupling block includes first and second coupling parts that are coupled with the connector and the fuse block, the first and second coupling parts including first and second fixing parts to fix a position of the connector and the fuse block,
   wherein the first and second coupling parts include coupling holes, and
   wherein the battery module includes fasteners sequentially inserted through the auxiliary cover, the connector, and the fuse block and fitted to the coupling holes.

2. The battery module as claimed in claim 1, wherein the coupling block includes:
   a basic structure; and
   an accommodation part at a lower portion of the basic structure to accommodate the circuit; and
   wherein the first and second coupling parts are at upper portions of the basic structure.

3. The battery module as claimed in claim 2, wherein the connector and the fuse block include assembly protrusions inserted into the first and second fixing parts.

4. The battery module as claimed in claim 3, wherein the first and second fixing parts include walls entirely or partially surrounding the assembly protrusions.

5. The battery module as claimed in claim 2, wherein the first and second coupling parts are at exclusive positions in a non-overlapping manner.

6. The battery module as claimed in claim 2, wherein:
   a plurality of first coupling parts are at positions corresponding to at least two of four corners of the connector, and a plurality of second coupling parts are at positions corresponding to at least two of four corners of the fuse block.

7. The battery module as claimed in claim 2, wherein:
the first coupling part is on an upper portion of the basic structure, and
the second coupling part includes a wing extending from the basic structure.

8. The battery module as claimed in claim 7, wherein the wing includes a bending point from which the wing extends in different directions.

9. The battery module as claimed in claim 2, wherein:
the basic structure has a box shape with an open lower side to accommodate the circuit, and
a leg with a flange shape for the frame, the leg on the opened lower side of the basic structure.

10. The battery module as claimed in claim 9, wherein the leg includes a third coupling part coupled to the frame.

11. The battery module as claimed in claim 2, wherein the basic structure includes an opening exposing a front side of the circuit.

12. The battery module as claimed in claim 1, further comprising:
a bus bar to provide a current flow path with the fuse block,
wherein the coupling block includes a support protrusion and wherein the bus bar is fitted around the support protrusion.

13. The battery module as claimed in claim 12, wherein the coupling block includes a guide to guide the bus bar.

14. The battery module as claimed in claim 12, wherein first and second bus bars are fitted around the support protrusion in an overlapping manner and are electrically connected to the support protrusion.

15. The battery module as claimed in claim 12, wherein the support protrusion includes a metallic material.

16. The battery module as claimed in claim 12, wherein:
the bus bar includes first and second bus bars electrically connected to each other through a fuse of the fuse block, and
the fuse and at least one of the first or second bus bars are fitted around the support protrusion in an overlapping manner.

17. The battery module as claimed in claim 1, wherein:
the connector and the fuse block are coupled to the coupling block, and
the connector and the fuse box coupled to the coupling block from an upper side of the cover when the connector and the fuse block are fixed to the coupling block.

18. A battery module, comprising:
a battery pack;
a circuit to control charge and discharge operations of the battery pack;
a connector through which current is output from the battery pack;
a fuse block to selectively interrupt current of the battery pack;
a frame to support the circuit, the connector, and the fuse block; and
a coupling block accommodating the circuit at a first side and supporting the connector and the fuse block at a second side at upward positions relative to the frame,
wherein the coupling block includes first and second coupling parts that are coupled with the connector and the fuse block, the first and second coupling parts including first and second fixing parts to fix a position of the connector and the fuse block,
wherein the connector and the fuse block include smooth-sided assembly protrusions inserted into the first and second fixing parts, and
wherein the first and second fixing parts include smooth-sided walls that are complementary to the smooth-sided assembly protrusions and that entirely or partially surround the assembly protrusions.

* * * * *